J. H. FRAMPTON.

Corn Planter and Plow.

No. 76,738.    Patented April 14, 1868.

Witnesses:

Inventor:

United States Patent Office.

J. H. FRAMPTON, OF HOPEWELL, OHIO.

Letters Patent No. 76,738, dated April 14, 1868.

IMPROVEMENT IN CORN-PLANTER AND PLOUGH.

The Schedule referred to in these Letters Patent and making part of the same.

TO ALL WHOM IT MAY CONCERN:

Be it known that I, J. H. FRAMPTON, of Hopewell, in the county of Muskingum, and State of Ohio, have invented a new and improved Corn-Planter and Plough; and I do hereby declare that the following is a full, clear, and exact description of the construction and operation of the same, reference being had to the annexed drawings, making a part of this specification, in which—

In this invention, a seed-box and distributing-arrangement are attached to and used in connection with a common plough, the distribution of the seed being regulated in a novel and very convenient manner by hand. A new device is also employed for adjusting the pitch of the two rear teeth.

Figure 1:
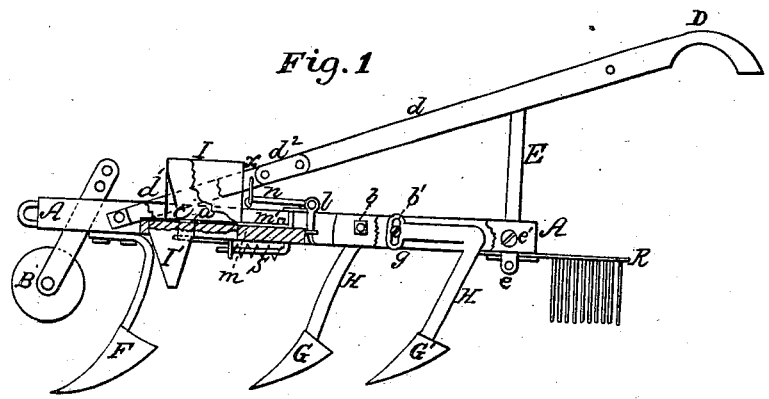
Figure 1 is a side elevation, showing a portion in section.
Figure 2:
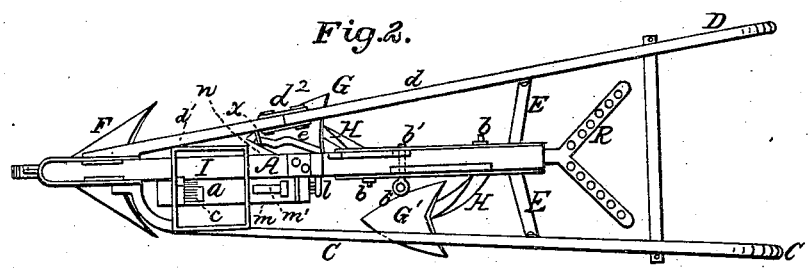
Figure 2 is a top view.

In the drawings, A represents the beam; B, the roller; C, one of the plough-handles, formed in a single piece, as in the old ploughs; D, the other handle, formed of two pieces, $d$ $d^1$, jointed together by a hinge, $d^2$; E E, standards supporting each handle, and adjustable in height by means of a series of holes, $e$ $e$, and a screw, $e'$; F, the front plough, fixed firmly to the beam, and made somewhat larger than the other ploughs; and H H the standards that support the two last-mentioned ploughs. These standards are both fastened at their upper end to the single beam A, being bent out from the beam, as seen in fig. 2, so as to throw one of the ploughs G to the right, and the other, G', to the left of the furrow made by the forward plough. The upper end of each standard is bent forward, and provided with an enlarged vertically-slotted extremity, $g$. The standards are fastened to the beam by a transverse bolt, $b$, which passes through each one near the elbow, and upon which the standard is pivoted, and a clamping-bolt, $b'$, which passes through the slot of the head $g$, and by adjusting that head up and down, serves to regulate the pitch of the ploughs G G'. I is the seed-box, from which the seed is fed through a conductor, I'. The plough-beam forms the bottom of the seed-box on one side, and on the other the bottom is formed by a horizontal longitudinally-sliding plate, $m$. A brush, $c$, is affixed to the front inner wall of the seed-box, and the hole $a$ in the plate $m$, through which the seed passes from box I to conductor I', passes under the brush when slide $m$ is thrown forward, at once stopping the delivery of the seed and brushing the hole clear of all obstruction, so that when thrown back into position for feeding again, the course of the seed will be uninterrupted. The sliding bottom $m$ can be thrown forward at any moment by depressing the rear end of the handle D upon the fulcrum E, it being connected with that handle at the point $x$, by means of a bent lever, $l$, and connecting-rod $n$. A spring, $s$, is provided, to throw the sliding bottom back when the handle D resumes its position, as seen in the drawing, fig. 1. For the purpose of adjusting the feed to different kinds of seed, the slide $m$ may be made of a bottom plate, having a top plate sliding longitudinally on it, and capable of being fixed in any relative position with it, by means of a slot and set-screw, $m'$. R is a covering-attachment fixed to the rear end of the beam A.

Having thus described my invention, what I claim as new, and desire to secure by Letters Patent, is—

1. The handle D, composed of two pieces, $d$ $d^1$, hinged together at $d^2$, when used for the purposes set forth.

2. The combination of the hinged handle D with the rod $n$, lever $l$, and sliding bottom $m$ of the seed-box I, when operating substantially as and for the purposes set forth.

J. H. FRAMPTON.

Witnesses:
F. A. SEBORN,
JAMES G. ROMINE.